(12) United States Patent
Sawdon et al.

(10) Patent No.: US 6,928,459 B1
(45) Date of Patent: Aug. 9, 2005

(54) PLURALITY OF FILE SYSTEMS USING WEIGHTED ALLOCATION TO ALLOCATE SPACE ON ONE OR MORE STORAGE DEVICES

(75) Inventors: Wayne A. Sawdon, San Jose, CA (US); Roger L. Haskin, Morgan Hill, CA (US); Frank B. Schmuck, Campbell, CA (US); James C. Wyllie, Monte Sereno, CA (US)

(73) Assignee: International Business Machines Corporation, Armonk, NY (US)

( * ) Notice: Subject to any disclaimer, the term of this patent is extended or adjusted under 35 U.S.C. 154(b) by 687 days.

(21) Appl. No.: 09/618,508

(22) Filed: Jul. 18, 2000

(51) Int. Cl.[7] ............................................. G06F 17/30
(52) U.S. Cl. ...................... 707/205; 707/204; 709/222; 711/5
(58) Field of Search ................................. 707/200–204, 707/205; 711/4, 5, 6, 111, 114, 165, 171; 709/221, 222; 714/6, 12, 16; 713/330

(56) References Cited

U.S. PATENT DOCUMENTS

| | | | |
|---|---|---|---|
| 3,715,730 A | * 2/1973 | Smith et al. .................... 707/6 |
| 3,715,840 A | * 2/1973 | Masten et al. .................. 707/3 |
| 5,301,350 A | * 4/1994 | Rogan et al. ............. 707/104.1 |
| 5,394,531 A | * 2/1995 | Smith .......................... 711/136 |
| 5,423,046 A | * 6/1995 | Nunnelley et al. ........... 713/330 |
| 5,583,995 A | 12/1996 | Gardner et al. ........ 395/200.09 |
| 5,659,704 A | 8/1997 | Burkes et al. ............... 395/441 |
| 5,687,363 A | * 11/1997 | Oulid-Aissa et al. .......... 707/4 |
| 5,721,909 A | * 2/1998 | Oulid-Aissa et al. ......... 707/10 |
| 5,732,239 A | 3/1998 | Tobagi et al. ................ 395/441 |
| 5,754,756 A | 5/1998 | Watanabe et al. ...... 395/182.04 |
| 5,774,643 A | 6/1998 | Lubbers et al. ........ 395/182.18 |
| 5,845,319 A | 12/1998 | Yorimitsu ................... 711/114 |
| 5,937,428 A | 8/1999 | Jantz ........................... 711/114 |
| 5,943,690 A | 8/1999 | Dorricott et al. ........... 711/171 |
| 5,960,446 A | 9/1999 | Schmuck et al. ........... 707/205 |
| 5,963,963 A | 10/1999 | Schmuck et al. ........... 707/205 |
| 6,016,552 A | 1/2000 | Lee et al. ....................... 714/6 |
| 6,023,706 A | 2/2000 | Schmuck et al. ........... 707/200 |
| 6,104,962 A | * 8/2000 | Sastry ......................... 709/226 |
| 6,122,646 A | * 9/2000 | Igarashi et al. ............. 707/205 |
| 6,253,296 B1 | * 6/2001 | Grimsrud et al. ........... 711/165 |
| 6,309,822 B1 | * 10/2001 | Fodor et al. ................... 435/6 |
| 6,314,102 B1 | * 11/2001 | Czerwiec et al. ........ 370/395.6 |

OTHER PUBLICATIONS

Fujiwara, Toru et al., "Performance Analysis of Disk Allocation Method Using Error–Correcting Codes", IEEE Transactions On Information Theory, vol. 37, No. 2, Mar. 1991, pp. 379–384.*

Jadav, Divyesh et al., "Techniques for Increasing the Steam Capacity of A High–Performance Multimedia Server", IEEE Transaction On Knowledge and Data Engineering, vol.11, No. 2, Mar./Apr. 1999, pp. 284–302.*

* cited by examiner

Primary Examiner—Shahid Alam
(74) Attorney, Agent, or Firm—Lawrence D. Cutter, Esq.; Blanche E. Schiller, Esq.; Heslin Rothenberg Farley & Mesiti, P.C.

(57) ABSTRACT

Space is allocated on storage devices in proportion to weights associated with the storage devices. The space is allocated by a plurality of file systems. In particular, space may be allocated on any one of the devices by one or more of the file systems. The weights can be dynamically adjusted at any time in order to accommodate changes in the system and to better utilize the storage devices. However, since more than one file system may be allocating space on one or more of the storage devices, changes in the weights are propagated to the various file systems that may utilize the information.

71 Claims, 7 Drawing Sheets fig. 1 fig. 2 fig. 3A fig. 3B fig. 4 fig. 5 fig. 6 fig. 7 fig. 8 fig. 9 fig. 10

PLURALITY OF FILE SYSTEMS USING WEIGHTED ALLOCATION TO ALLOCATE SPACE ON ONE OR MORE STORAGE DEVICES

CROSS-REFERENCE TO RELATED APPLICATIONS

This application contains subject matter which is related to the subject matter of the following application/issued patent, each of which is assigned to the same assignee as this application. Each of the below listed applications/patents is hereby incorporated herein by reference in its entirety:

"Determining The Order And Frequency In Which Space Is Allocated On Individual Storage Devices," Sawdon et al., Ser. No. 09/618,332, filed Jul. 18, 2000; and "Parallel File System And Method With Allocation Map," Schmuck et al., U.S. Pat. No. 5,960,446, Issued Sep. 28, 1999.

TECHNICAL FIELD

This invention relates, in general, to allocating space on storage devices, and in particular, to enabling a plurality of file systems to use weighted allocation to allocate space on one or more storage devices.

BACKGROUND ART

Many computing environments include file systems, which enable other application programs to store data on and retrieve data from storage devices. In particular, a file system allows application programs to create files and to give them names (a file is a named data object of arbitrary size), to store (or write) data into files, to read data from files, to delete files, and to perform other operations on files.

A file structure is the organization of data on the storage devices. In addition to the file data itself, the file structure contains meta data, which includes, for instance, the following: a directory that maps file names to the corresponding files; file meta data that contains information about the file, including the location of the file data on the storage device (i.e., which device blocks hold the file data); an allocation map that records which device blocks are currently in use to store meta data and file data; and a superblock that includes overall information about the file structure (e.g., the locations of the directory, allocation map, and other meta data structures).

In order to store successive data blocks of a file to distinct devices, such as disks or other storage devices, a technique known as striping is used. Striping may also be used to store the file system's meta data. The advantages of striping include high performance and load balancing. In striping, the file system writes successive blocks of a file, or the file's meta data, to distinct devices in a defined order. For example, the file system may use a round-robin allocation, in which successive blocks are placed according to a cyclic permutation of the devices. This permutation is called the stripe order. The stripe order defines the order and frequency of allocations (and thus, writes) to each device in the file system. For example, a system with four disks using a simple round-robin allocation scheme would allocate space on each disk in consecutive order, namely: 1, 2, 3, 4, 1, 2, 3, 4 . . . .

This simple round-robin allocation is used by most striped file systems for allocation. Although, round-robin allocations may be sufficient in some circumstances for a system that includes homogeneous devices, it proves to be inadequate for a system with heterogeneous devices, and it proves to be inadequate for various circumstances in which homogeneous devices are used.

As one example, a round-robin allocation is inadequate for devices of different storage capacities or throughput. Under round-robin allocation, all devices are allocated equally. Consequently, subsequent access to the data is typically spread equally across the devices as well. For systems that include devices with different storage capacities, the small devices fill before the larger devices and then, must be excluded from the stripe order, thus reducing the parallelism and performance for all subsequent writes. Furthermore, the data striped across the reduced set of devices has reduced performance for all subsequent accesses.

Likewise, for systems that include devices with different throughput, round-robin allocation fails to maximize the throughput for allocation and all subsequent accesses to the data. Additionally, round-robin allocation has no capability for rebalancing a system that is in an unbalanced state. An unbalanced state can occur for a variety of reasons including, for instance, when devices are partitioned between files or operating systems; when empty devices are added to an existing file system; or when the allocation policy changes. To rebalance such a system, extraordinary measures are required by the user, such as restriping of all the data in the file system.

Striping can be performed by a single file system, or by a plurality of file systems of a shared device file environment (e.g., a parallel environment). In a shared device file environment, a file structure residing on one or more storage devices is accessed by multiple file systems running on multiple computing nodes. A shared device file environment allows an application (or job) that uses the file structure to be broken up into multiple pieces that can be run in parallel on multiple nodes. This allows the processing power of these multiple nodes to be brought to bear against the application.

The above-described problems associated with striping are exacerbated in a parallel environment. Thus, a need still exists for a parallel allocation technique that is general enough to be used in a wide variety of circumstances. Further, a need exists for a capability that enables rebalancing of the allocations to better match the current conditions and requirements of the system and/or devices.

SUMMARY OF THE INVENTION

The shortcomings of the prior art are overcome and additional advantages are provided through the provision of a method of managing the allocation of space on storage devices of a computing environment. The method includes, for instance, obtaining one or more weights for one or more storage devices of the computing environment; and allocating space on at least one storage device of the one or more storage devices in proportion to at least one weight obtained for the at least one storage device, wherein the allocating is performed by a plurality of file systems of the computing environment.

In a further embodiment, a method of managing the allocation of space on storage devices of a computing environment is provided. The method includes, for instance, obtaining a weight for each storage device of at least a subset of storage devices of a plurality of storage devices of the computing environment; and allocating space on each storage device of the at least a subset of storage devices in proportion to the weight assigned to the storage device, wherein the allocating is performed by a plurality of file systems such that each file system of the plurality of file systems allocates space on one or more storage devices of the at least the subset of storage devices.

System and computer program products corresponding to the above-summarized methods are also described and claimed herein.

The capabilities of one or more aspects of the present invention advantageously provide for the allocation of space, by a plurality of file systems, across one or more storage devices, such that the space on each device is allocated and thus, consumed in proportion to some weight assigned to that device. The weights assigned to the devices can dynamically change, and thus, one aspect of the present invention enables these changes to be tracked and propagated to other file systems needing or desiring this information. Further, recovery of the weights is provided for in the case one or more of the nodes having file systems fail.

Additional features and advantages are realized through the techniques of the present invention. Other embodiments and aspects of the invention are described in detail herein and are considered a part of the claimed invention.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

BEST MODE FOR CARRYING OUT THE INVENTION

In accordance with an aspect of the present invention, a plurality of file systems allocate space on one or more storage devices using weights associated with those devices. In particular, the weights associated with the storage devices are used to generate stripe orders, and each stripe order provides to a respective file system the order in which space on individual storage devices is to be allocated and the frequency of allocating space on those devices. The weight associated with each device is distributed to the file systems that are to allocate space on that device, so that the combined allocation remains proportional to the weights. Since the weights can dynamically be adjusted, the various file systems are kept up-to-date of the weight adjustments.

Figure 1:
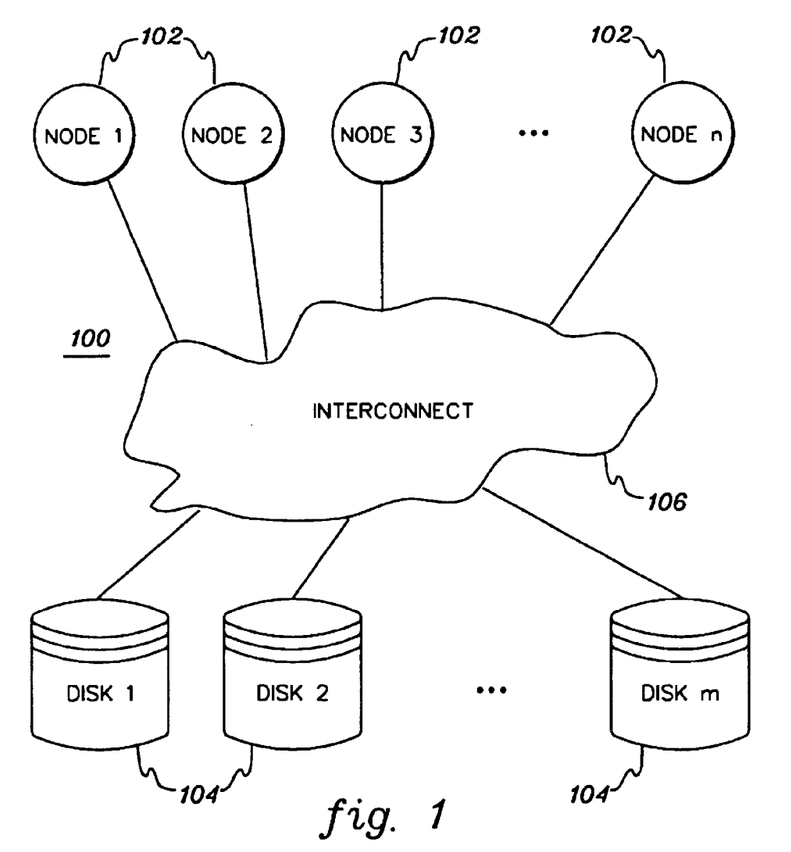
FIG. 1 depicts one example of a computing environment incorporating and using one or more aspects of the present invention.

One embodiment of a computing environment incorporating and/or using aspects of the present invention is described with reference to FIG. 1. Computing environment 100 includes one or more nodes 102 (e.g., Node 1, ... Node n), which share access to one or more storage devices 104 (e.g., Disk 1 ... Disk m, or other non-volatile memory). The nodes are coupled to each other and to the storage devices via an interconnect 106. In one example, the interconnect includes a wire connection, a bus, a token ring or a network connection, to name just a few examples. One communications protocol used by one or more of these connections is TCP/IP. It is assumed, in one example, that the nodes do not have shared memory.

As one example, a node 102 includes an operating system 200 (FIG. 2), such as the AIX operating system offered by International Business Machines Corporation. The operating system includes a file system 202 (e.g., a software layer), such as the General Parallel File System (GPFS) offered by International Business Machines Corporation, which is used to manage the allocation of space on various storage devices. In one or more of the embodiments described herein, it is assumed that each node has a single file system, and thus, some of the description references the node. However, in another example, a node may include a plurality of file systems. In that example, each participating file system on the node is kept up-to-date of weight changes and may be involved in recovery.

Figure 2:
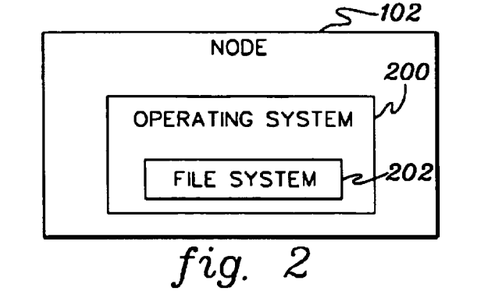
FIG. 2 depicts further details of a node of FIG. 1, in accordance with an aspect of the present invention.

File system 202 allocates space on various of the storage devices, such that the total allocation on each storage device is proportional to a weight obtained for that device. As used herein, the obtaining of weights can be accomplished in any manner including, but not limited to, receiving the weights, and assigning the weights. The weight obtained for each device is used in determining the allocation policy and allows the file system to balance the allocation across the devices to match individual device capacities and to better utilize the combined throughput of the devices. However, the weights and the allocation policy (i.e., the order and frequency of allocations on each device) are independent of the technique used for the allocation. That is, different allocation techniques can be used for the allocation. The allocation technique is not tied to the weights. This allows the weights to represent a variety of parameters (e.g., capacity weighting, free space weighting, throughput weighting, round-robin weighting, hybrid weighting, etc., described below), and allows the weights to dynamically change. Thus, the allocation policy can be changed at any time to better suit the current conditions or requirements. Further, any weighting technique used in obtaining the weights need not be known to the allocation technique.

Many different allocation techniques can be used to allocate space on the storage devices. Examples of such allocation techniques include a deterministic technique and a randomized technique, each of which is described in detail in co-filed, U.S. patent application Ser. No. 09/618,332, entitled "Determining The Order And Frequency In Which Space Is Allocated On Individual Storage Devices," Sawdon et al., filed Jul. 18, 2000, which is hereby incorporated herein by reference in its entirety.

In a parallel file system, multiple file systems (of one or more nodes) can allocate space on one or more storage devices. As examples, two or more file systems can allocate space on one storage device; and/or two or more file systems can allocate space on two or more storage devices in any combination (e.g., each of a plurality of file systems allocates space on a different device; and/or one or more file systems allocate space on one or more devices.) Any combination of a plurality of file systems allocating space on one or more devices is possible. Thus, space may be allocated on any one of the storage devices by any one or more of the file systems.

Figure 3A:
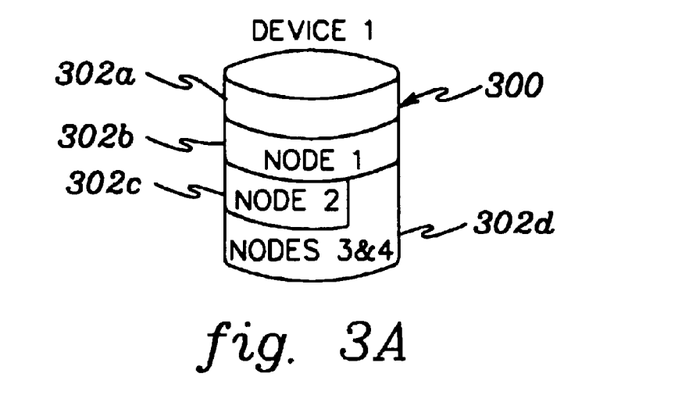
FIG. 3a depicts one example of a storage device being partitioned into a plurality of partitions in which each partition is owned by zero or more nodes, in accordance with an aspect of the present invention.

Since a plurality of file systems may allocate space on a particular storage device, in one example, the storage space on a device is partitioned into a plurality of partitions, as depicted in FIG. 3a. As shown in FIG. 3a, a device 300 is partitioned into a plurality of partitions 302a–d, and each partition is owned by zero or more of the nodes. For instance, partition 302a is unowned; partition 302b is owned by Node 1; partition 302c is owned by Node 2; and partition 302d is owned by Nodes 3 and 4. The one or more nodes that own the partition are allowed to allocate space in that partition. (In a further example, ownership could be based on file systems, in which each partition is owned by zero or more file systems, regardless of the nodes in which those file systems reside.)

In one embodiment, ownership information is maintained by a centralized allocation manager. This manager can be a part of one of the nodes participating in the allocation or another node that is used mainly for control and does not actually allocate. Examples of the partitioning of space and of a centralized allocation manager are described in U.S. Pat. No. 5,960,446, Schmuck et al., entitled "Parallel File System And Method With Allocation Map," Issued Sep. 28, 1999, which is hereby incorporated herein by reference in its entirety.

Figure 3B:
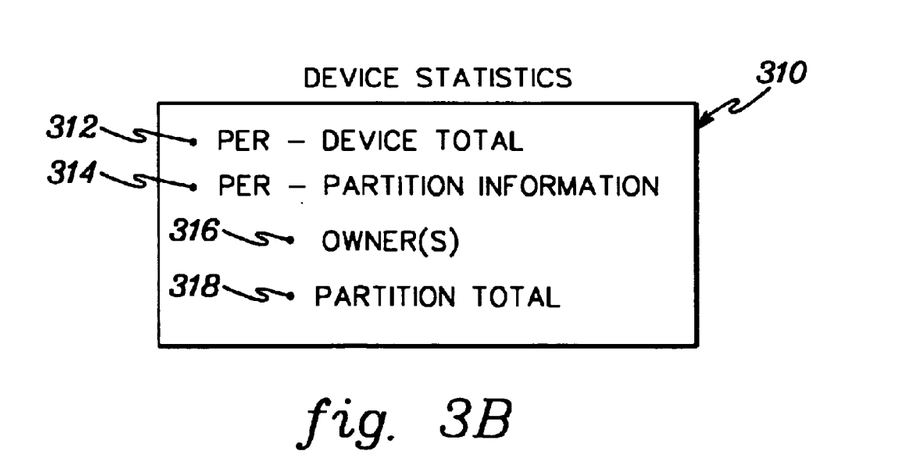
FIG. 3b depicts one example of various statistics associated with each storage device, in accordance with an aspect of the present invention.

The ownership information is maintained as part of various statistics associated with each storage device. In particular, each device has associated therewith the following statistics 310 (FIG. 3b), as one example:

(A) Per-Device Total: The device total represents how much of a particular parameter is associated with the device. For instance, the total may indicate the amount of free space on the device.

(B) Per-Partition Information:
  (1) Owner(s): An indication of the one or more owners of that particular partition; and
  (2) Partition Total: An indication of how much of the particular parameter is associated with the partition (e.g., the amount of free space in the partition).

In accordance with an aspect of the present invention, each file system that is to allocate space uses a weighted allocation technique to determine the order in which devices are selected for allocation and the frequency for allocating space on those devices. The file systems allocating space on a particular device agree upon the weight for that device, so that the total allocation of each device remains proportional to the weight assigned to that device. This agreement is provided by contacting the centralized allocation manager, as described below.

The weights used for allocation can dynamically change. Thus, the new values are propagated to the nodes (or file systems) needing or desiring the new information. The tracking and distribution of weights is, therefore, a part of the parallel weighted allocation technique of the present invention. Further, since parallel environments may suffer partial failures, with one or more nodes failing and restarting independently, the allocation technique of the present invention also includes recovery.

Figure 4:
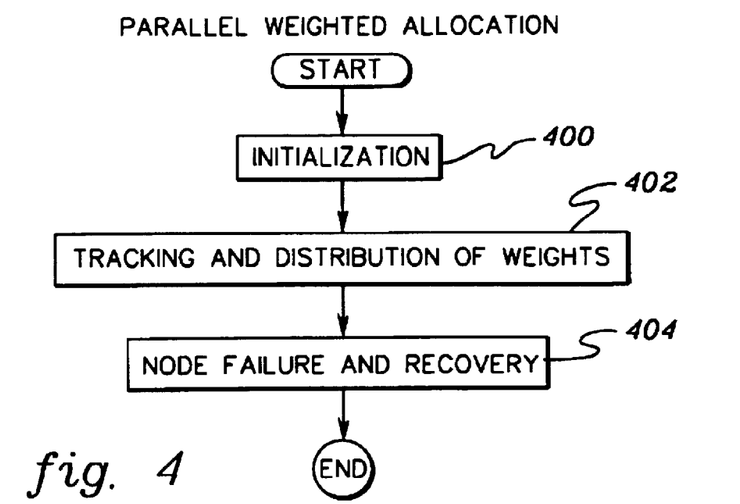
FIG. 4 depicts one embodiment of the logic associated with a parallel weighted allocation technique, in accordance with an aspect of the present invention.

One example of a weighted allocation technique of a parallel file system is described with reference to FIG. 4. As shown in FIG. 4, the technique includes three main actions, including initialization, STEP 400, tracking and distribution of weights, STEP 402, and node failure and recovery, STEP 404. Each of these actions can be implemented in various ways. Two possible embodiments for each action are described herein. The first embodiment is referred to as a no-state embodiment, which uses a minimal amount of state, but has a higher time for recovery from a node failure. The second embodiment is referred to as a full-state embodiment, in which the allocation manager is used to maintain the partition ownership information, as well as complete per-device-per-partition counters. This extra state serves to reduce the time for recovery. Each of these embodiments for each of the actions is described in further detail below.

One example of the initialization action is described in further detail with reference to FIG. 5. Both embodiments of this action (i.e., the no-state embodiment and the full-state embodiment) perform the actions depicted in FIG. 5.

Initially, the file system selects an allocation manager, STEP 500. In one example, the first node that attempts to run the initialization logic is designated as the allocation manager. The other nodes are referred to as client nodes. The client nodes locate the allocation manager using, for instance, a global naming service, and wait for the allocation manager's initialization to complete.

Subsequent to appointing the allocation manager, the allocation manager determines the initial weights to be used for allocation, STEP 502. The allocation manager may determine the weights serially working alone or in parallel by enlisting the assistance of one or more of the client nodes.

The initial weights depend on the weighting technique used. A variety of weighting techniques are available including techniques based on static parameters, as well as techniques based on dynamic parameters. Examples of various techniques include, for instance, the following:

(1) Round-Robin Weighting—To implement a simple round-robin allocation, the weight of each device is set to 1. Using an equal weight for each device, the technique will allocate space on each device an equal number of times.

(2) Capacity Weighting—To better distribute the allocations across uneven sized devices, the weights can be assigned using the relative capacity of each device. This weighting technique causes the devices to fill in the same proportion (i.e., the percentage utilized on each device is the same, regardless of the capacity of the device). Consequently, the expected I/O load on each device is also in proportion to the device's capacity.

For capacity weighting, the allocation manager determines the maximum storage capacity of each device. This can be done in a number of ways, such as examining a descriptor for each device.

(3) Free Space Weighting—In this dynamic weighting technique, the weights may be based upon the relative amount of free space on each device. Under this technique, devices with a higher percentage of free space receive proportionately more allocations. This serves to rebalance unevenly filled devices, which may have resulted from adding new devices to an existing system or previously using round-robin allocation on uneven sized devices. The weights can be adjusted dynamically to account for changes in the relative amount of free space. For devices that are evenly filled, the free space weighting technique is equivalent to capacity weighting.

For free space weighting, each device is examined to determine the number of free blocks on each device. In one example, the allocation map of the device can provide this information. (Allocation maps are described in U.S. Pat. No. 5,960,446, Schmuck et al., entitled "Parallel File System And Method With Allocation Map," Issued Sep. 28, 1999, which is hereby incorporated herein by reference in its entirety.)

(4) Throughput Weighting—The weights can also be assigned based on the relative performance of each device. Devices with higher throughput receive proportionately more allocations and consequently, more I/O requests on the average. This weighting attempts to maximize the total throughput of the combined devices.

There are a number of ways to determine the throughput weights during initialization, including, for instance, reading the device throughput from a table or by measuring the device throughput by measuring the actual throughput to each device, while the system is under a maximal I/O load.

(5) Hybrid Weighting—Not only can the weights be changed dynamically, the technique for assigning the weights can also be changed. Furthermore, a combination of two or more weighting techniques to produce a hybrid weighting can be used. This may be accomplished by computing the normalized weight for each device under more than one technique, then adding the normalized weights for a device from each desired technique. This allows the system to tailor the allocation to the current requirements and to change the allocation as the system changes.

Figure 5:
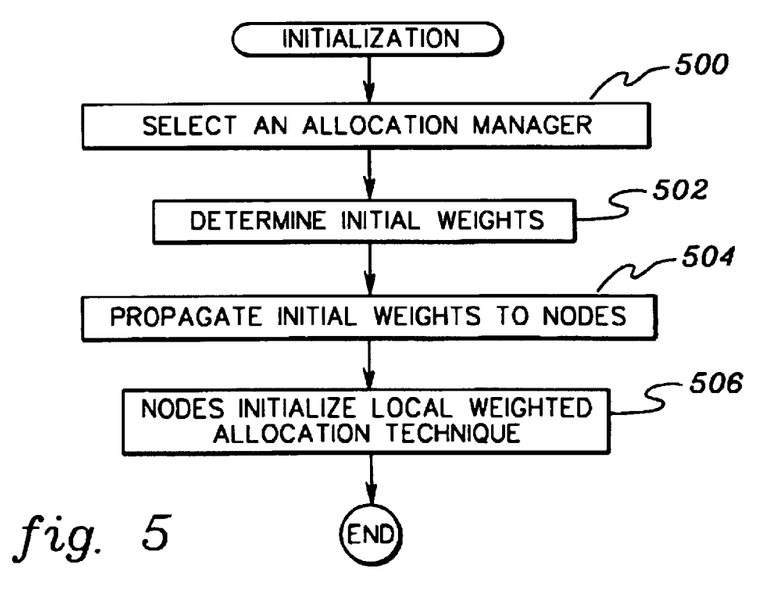
FIG. 5 depicts one embodiment of the logic associated with the initialization action of FIG. 4, in accordance with an aspect of the present invention.

Continuing with reference to FIG. 5, after the initial weights have been collected, the allocation manager propagates the weights to the other nodes (or other file systems), STEP 504. In one example, the weights are propagated to all of the nodes participating in allocation. In another example, the weight of a particular device is only propagated to the nodes that are to use that weight. The propagation can be performed using a number of techniques, including passing messages or broadcasting.

Thereafter, each file system that is to allocate uses the weights to initialize a local weighted allocation technique, STEP 506. The local weighted allocation technique is a technique executed by the file system to generate the stripe order used to define the order and frequency of allocation on the storage devices. This technique includes, for instance, an initialization step that normalizes the weights and sets some variables; and a stripe order generation step that uses the normalized weights to determine the stripe order. Other steps may also be included, depending on the type of allocation technique.

Various weighted allocation techniques are described in detail in co-filed, U.S. patent application Ser. No. 09/618,332, entitled "Determining The Order And Frequency In Which Space Is Allocated On Individual Storage Devices," Sawdon et al., filed Jul. 18, 2000, which is hereby incorporated herein by reference in its entirety. Examples of these techniques include a deterministic technique and a randomized technique. In one example, if the deterministic technique is used, the starting position within the stripe order is random. Thus, different file systems may begin at different positions within the stripe orders.

Initializing the local weighted allocation technique completes the initialization action. As mentioned above, both the no-state and full-state embodiments perform the above-described actions. However, in addition to the above, the full-state embodiment, when using dynamic weighting, like free space weighting, also saves the free space for each device in each partition in a per-device-per-partition table (See FIG. 3b).

Referring back to FIG. 4, subsequent to performing the initialization, the action of tracking and distribution of weights is performed, STEP 402. Weights based on dynamic information, such as free space per device, is periodically updated in order to maintain their accuracy. Weights based on static information, such as capacity, is updated when, for instance, the configuration changes or when there is a change in the allocation policy. One embodiment of the logic employed in tracking and distributing weights is described with reference to FIG. 6. This particular example is described with reference to the tracking and distribution of free space (a dynamic weight). However, the logic is similarly applicable to other dynamic weights or to static weights.

Figure 6:
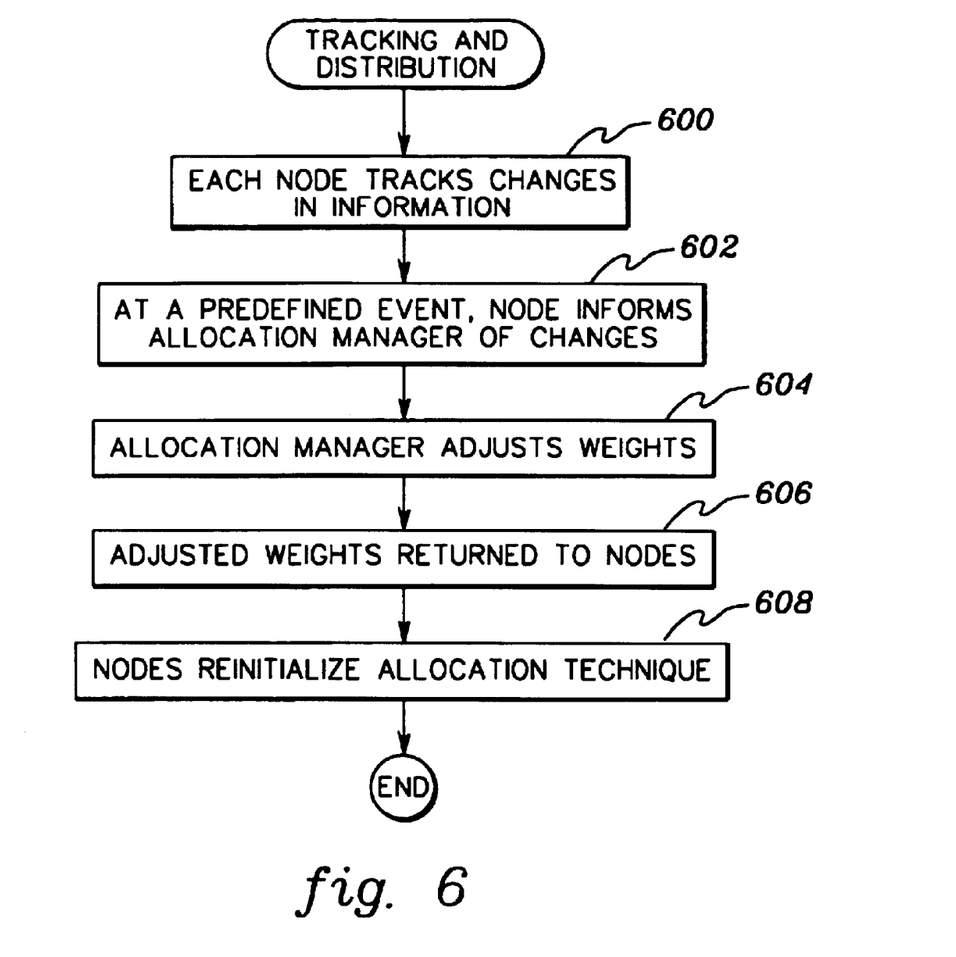
FIG. 6 depicts one embodiment of the logic associated with the tracking and distribution action of FIG. 4, in accordance with an aspect of the present invention.

Referring to FIG. 6, each of various nodes tracks the changes in information (i.e., dynamic information and/or static information), STEP 600. As one example, for free space weighting, each appropriate node tracks the number of allocations and deallocations that it performs on each device. The net allocations per device, called the delta, is the difference in free space on each device caused by operations at that node. The client node accumulates the deltas until some threshold (e.g., 100 operations) is met. When the threshold is met or at another predefined event (e.g., every 30 seconds), the node informs the allocation manager of the changes, STEP 602. In particular, a communications mechanism is used by the client node to send the deltas to the allocation manager. After successfully sending the deltas, the client node then resets its delta counters to zero.

Upon receiving the deltas from a client, the allocation manager adds them to the total free space counters, which are maintained by the allocation manager (see per-device total 312 of FIG. 3b), STEP 604. That is, the allocation manager adjusts the weights for particular devices based on the deltas that it receives.

Subsequent to adjusting the weights, the adjusted weights (e.g., the new total free space counters for the devices) are returned to the client in reply to the message sending the deltas, STEP 606. As the client receives the adjusted weights, the client reinitializes its local allocation technique using the adjusted weights, STEP 608. Thus, a new stripe order is generated.

The above-described communication between the clients and allocation manager enable the clients, once they have communicated with the allocation manager, to agree on the weights to be used. This agreement can come quicker, if the nodes are informed quicker about the new weights. The decision of when and how to tell the clients is embodiment dependent.

For example, the threshold used by the clients for sending the deltas also serves to bound the difference between the total free space counters maintained by the allocation manager and the actual amount of free space on each device. To maintain the same degree of accuracy of the weights used by the client nodes, any large change in the weights caused by, for instance, a change in the allocation policy, a change in the hardware configuration, or a large accumulative change due to deltas received from a set of very active client nodes, causes the allocation manager, in one example, to immediately send the new weights to the client nodes. This change in weights does not effect the current deltas stored at the nodes.

The above actions are performed for each of the two embodiments described herein (i.e., the no-state embodiment and the full-state embodiment). However, for the full-state embodiment, each client node maintains separate delta counters for each partition that it modifies. Upon receiving the per-partition deltas, the allocation manager updates the per-device-per-partition counters 318 (FIG. 3b), as well as the device totals 312.

Returning to FIG. 4, in addition to the tracking and distribution of weights, which enables the rebalancing of a system based on weighted allocation, the parallel weighted allocation technique of the present invention also provides for recovery from a node failure, STEP 404. Nodes in a parallel file environment may fail or be restarted independently of each other. To handle node failures, the volatile state lost by the failed node is to be reconstructed by another node. This recovery depends on a number of factors, including, for instance: whether the failed node is a client or acting as the allocation manager; on whether the weights are static or dynamic; and for dynamic weights, it also depends on the amount of state maintained by the allocation manager.

There are three main cases to be considered herein: recovery using static weights, recovery using dynamic weights with a no-state embodiment, and recovery using dynamic weights with a full-state embodiment. For each of these cases, an example technique for recovery is described for failure from a single client node or from the allocation manager's node. The techniques are easily extended to handle multi-node failures, as long as a quorum of the nodes remain available, in one example. The recovery from node failure, which is managed by the file system, is further described with reference to FIGS. 7–10.

Figure 7:
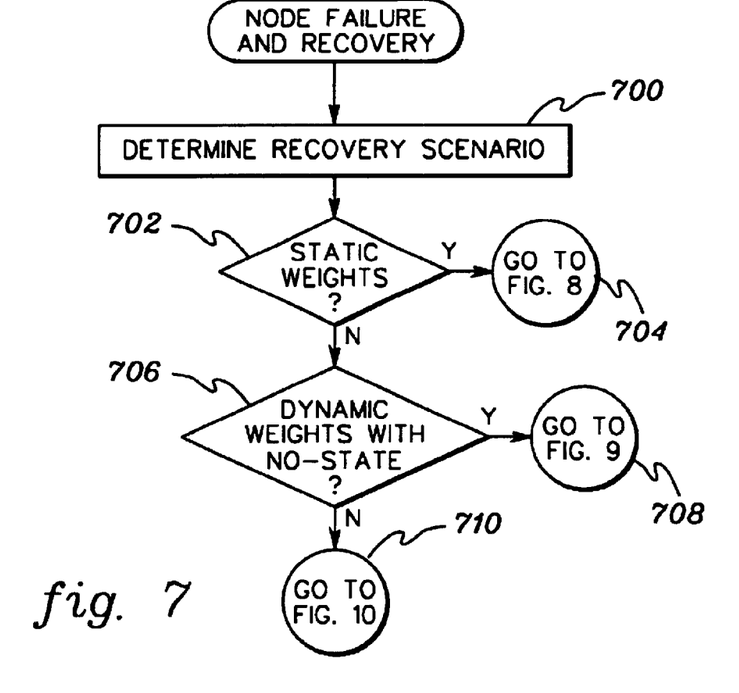
FIG. 7 depicts one embodiment of the logic associated with the node failure and recovery action of FIG. 4, in accordance with an aspect of the present invention.

Referring to FIG. 7, initially a determination is made as to the type of recovery that is needed, STEP 700. For instance, a determination is made as to whether recovery of static weights is needed, INQUIRY 702. If it is a recovery of static weights, then processing continues with the logic of FIG. 8, STEP 704.

Figure 8:
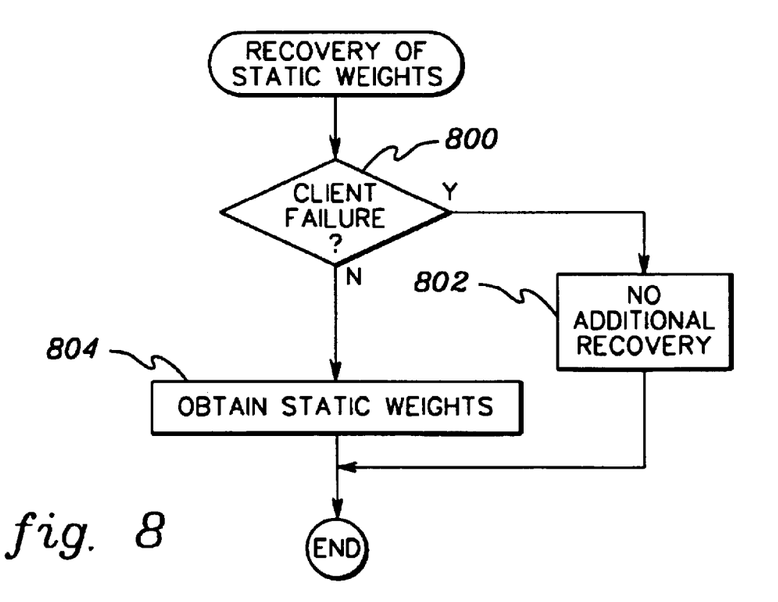
FIG. 8 depicts one embodiment of the logic associated with the recovery of static weights, in accordance with an aspect of the present invention.

Referring to FIG. 8, initially a determination is made as to whether a client node failed, INQUIRY 800. If a client node failed, then no additional recovery is needed, STEP 802. However, if it was not a client node, and therefore, an allocation manager that failed, then the static weights are recovered, STEP 804. In one example, the static weights are recovered by obtaining them from a client node or reconstructing them from other available information. The nodes that did not fail can continue allocating as usual, even throughout the recovery of the failed node.

Referring back to FIG. 7, if the recovery is not of static weights, then it is assumed to be recovery of dynamic weights. Therefore, a determination is made as to whether it is recovery of dynamic weights with no-state, INQUIRY 706. If it is a no-state recovery of dynamic weights, then recovery proceeds as described with reference to FIG. 9, STEP 708. Again, the examples are described with reference to free space, but can be extended to other dynamic weights.

Figure 9:
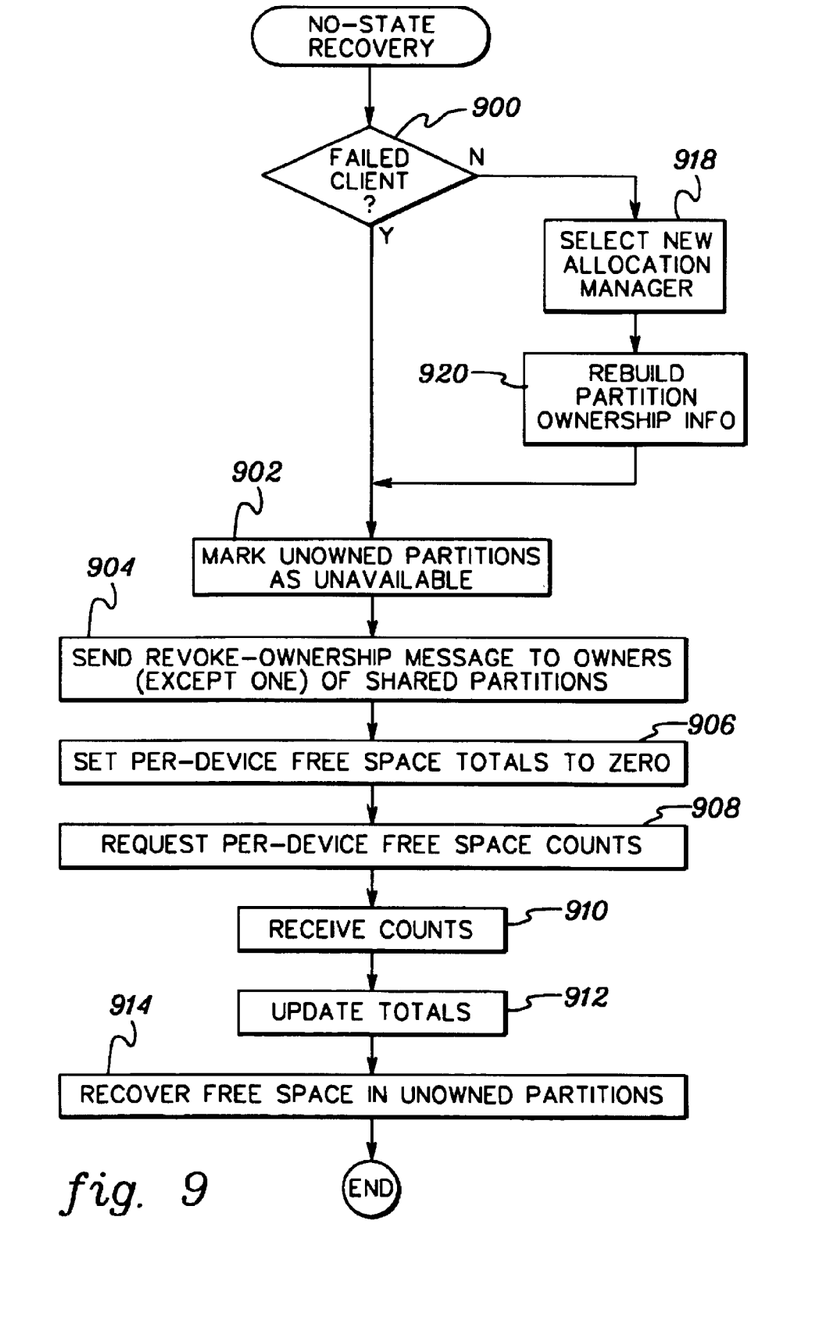
FIG. 9 depicts one embodiment of the logic associated with no-state recovery of dynamic weights, in accordance with an aspect of the present invention.

Referring to FIG. 9, initially a determination is made as to whether it was a client node that failed, INQUIRY 900. If the client node failed, then the allocation manager checks the partition ownership information for partitions that are not owned and marks these partitions as unavailable to prevent them from being assigned to a client node until the recovery associated with the partition is complete, STEP 902. (When a node fails, partitions owned by that node become unowned.)

Additionally, the allocation manager checks the partition ownership information for partitions owned by more than one node. For each shared partition, it sends a revoke-ownership message to all the owners except one, STEP 904. This minimizes the number of nodes to be involved in the recovery.

The allocation manager then sets the per-device free space totals to zero, STEP 906, and sends a broadcast message to the non-failed nodes asking them for the per-device free space counts for the partitions that are owned by that node, STEP 908.

Upon receiving this message, each appropriate client node stops allocating and resets its delta counters to zero. Further, it returns the per-device free space count for each owned partition to the allocation manager. The node may then resume allocating space in the partitions that it currently owns.

As the allocation manager receives the replies, STEP 910, the per-device free space counts are added to the totals, STEP 912. Further, the free space in all unowned partitions is also recovered, STEP 914. This may be done serially by the allocation manager or in parallel by enlisting the aid of the client nodes. In one example, since the no-state embodiment lacks the state information to delimit the recovery to only the partitions modified by the failed node, recovery of a failed node includes the reading of the non-volatile allocation maps in order to reconstruct the per-device free space totals. As each unknown partition is recovered, it becomes eligible for assignment and is marked as available. This completes the no-state recovery of dynamic weights for a failed client. Upon completion of the recovery, a value for the dynamic weight (e.g., total free space) has been recomputed, and this adjusted weight can be forwarded to one or more file systems, as described above.

Returning to INQUIRY 900, if the failed node is the allocation manager, then a new allocation manager is selected, STEP 918. In one example, the new allocation manager is selected by assigning the function to the non-failed node with the lowest id/address.

The newly assigned allocation manager rebuilds the partition ownership information, STEP 920. In one example, this is accomplished by requesting information from the other nodes regarding the partitions that they own-. For example, the allocation manager sends a broadcast message to the surviving nodes asking them to identify the partitions that they own. Thereafter, recovery proceeds with STEP 902, as described above.

Returning to FIG. 7, if recovery is of dynamic weights with full-state capabilities, INQUIRY 706, then recovery proceeds as described with reference to FIG. 10, STEP 710. In this example, the state maintained by the full-state embodiment enables the recovery from a failed node to be of the partitions owned by the node that failed. It also allows the non-failed client nodes to continue allocating through the recovery.

Figure 10:
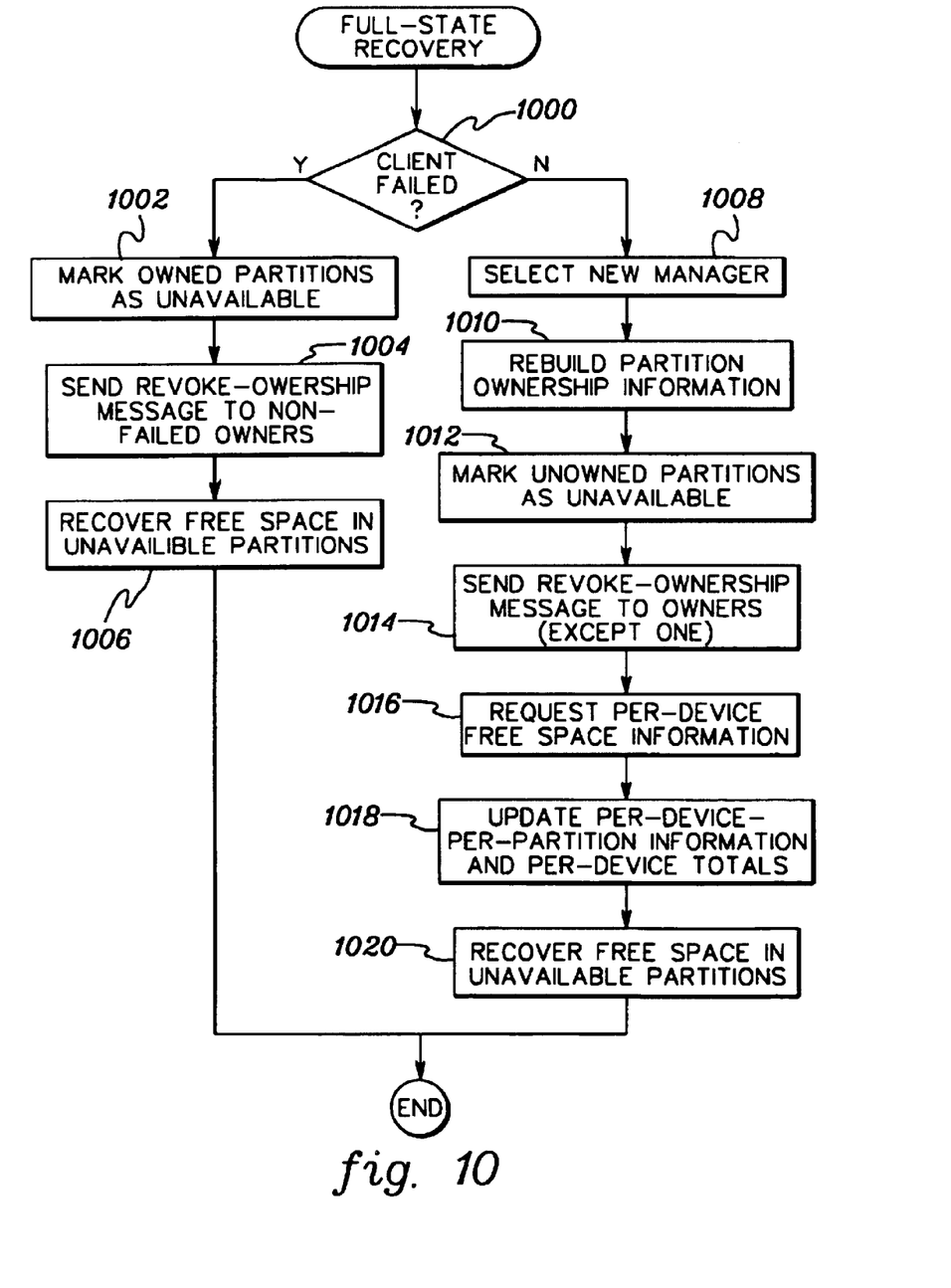
FIG. 10 depicts one embodiment of the logic associated with full-state recovery of dynamic weights, in accordance with an aspect of the present invention.

Referring to FIG. 10, initially, a determination is made as to whether it was a client node that failed, INQUIRY 1000. If it is a client node that failed, the allocation manager checks the partition ownership information for partitions that were owned by the failed node. These partitions are marked as unavailable to prevent them from being reassigned until after their recovery is complete, STEP 1002.

The allocation manager then checks the partition ownership information for partitions owned by the failed node and shared with one or more nodes. For each such shared partition, the allocation manager sends a revoke-ownership message to all non-failed owners, STEP 1004. Upon receiving this message, a client releases ownership on the partition and sets the partition's delta counters to zero.

Thereafter, the free space in the unavailable partitions is recovered either serially by the allocation manager or in parallel by enlisting the aid of one or more of the client nodes, STEP 1006. As each partition is recovered, the per-device totals and per-device-per-partition information is updated and the partition is marked as available for assignment. This completes the recovery from a failed client node.

Returning to INQUIRY 1000, if it was the allocation manager that failed, then recovery proceeds as follows. Initially, a new allocation manager is selected, STEP 1008. In one example, this is accomplished by assigning the function to the non-failed node with the lowest id/address.

The newly assigned allocation manager rebuilds the partition ownership information, STEP 1010. In one example, the information is built by sending a broadcast message to the surviving nodes asking them for the partitions that they own. Partitions that are unowned are marked as unavailable by the allocation manager to prevent them from being allocated until recovery is complete, STEP 1012.

The allocation manager then checks the partition ownership information for partitions owned by one or more nodes. For each shared partition, the allocation manager sends a revoke-ownership message to all the owners except one, STEP 1014. Upon receiving this message, a client releases ownership on the partition and sets the partition's delta counters to zero.

The allocation manager then sends a broadcast message to the nodes asking them to send the per-device free space information for each partition that they own, STEP 1016. Upon receiving this message, a client resets the partition's delta counters to zero and returns the per-device free space information to the allocation manager.

As the allocation manager receives the replies, it updates the per-device-per-partition information, as well as the per-device totals, STEP 1018.

Subsequently, the free space in the unavailable partitions is recovered either serially by the allocation manager or in parallel by enlisting the aid of one or more of the client nodes, STEP 1020. As each partition is recovered, the per-device totals and per-device-per-partition information is updated and the partition is marked as available for assignment. This completes the full-state recovery of dynamic weights.

In accordance with an aspect of the present invention, the recovery techniques (both for static and dynamic weights) maintain goal weight values associated with each device. In particular, in one example, each device has a goal weight associated therewith. In the case of static weighting, the goal weights are equivalent to the static weights, and thus, no distinction need be made. However, in dynamic weighting, the goal weights (which are static, in one example) may be different than the weights being used, at any particular time. That is, the weights being used may have been adjusted such that the goal weights are satisfied. This maintaining of the goal weights of the devices is accomplished even if one or more nodes (or file systems) fail. Also, it is maintained even if one or more storage devices fail and are restarted or replaced.

Described in detail above is a parallel weighted allocation capability that enables a plurality of file systems to use weighted allocation to allocate space on one or more storage devices. The space is allocated on the shared storage devices, such that the space on each device is consumed in proportion to some weight assigned to that device. This allows the allocation to be balanced across the devices, such that the load on each device is proportional to the weight assigned to that device. For a parallel environment, the weight assigned to each device is distributed to the various file systems using that weight, so that the combined allocation remains proportional to the weights. Furthermore, the file systems are kept up-to-date as the weights change or the technique of assigning the weights change.

In one example, different file systems can use different allocation techniques in order to allocate space on various storage devices. In one example, this is accomplished by grouping the storage devices into groups, wherein a file system using one allocation technique allocates space on one group of devices and a file system using a different technique allocates space on a different group of devices. In another example however, the grouping is not used.

Further, the weights obtained by various file systems can represent different parameters. For instance, one file system can obtain weights based on free space and another file system can obtain weights based on capacity. Again, in one example, the storage devices may be grouped into differing groups in order to accommodate the usage of different weighting techniques. In another example however, the grouping is not used.

In yet a further example, the allocation policy can be set at various levels. In particular, one or more stripe orders can be generated and used to allocate space across the storage devices. As examples, one stripe order can be used for all allocations of a file system; in another example, the storage devices are partitioned into groups, and a stripe order is generated and used for each group; and in yet another embodiment, a stripe order is generated for each file that is going to have space allocated therefor. Thus, in the last example, one stripe order can be used to allocate space for one file, and another stripe order (the same or different) can be used to allocate space for another file. In any of the above scenarios, the stripe orders are generated, as described above.

Although weighted allocation depends on the weights to determine the allocation policy, the allocation techniques themselves are independent of the actual weights assigned to each device. The weights can be changed at any time, to adjust the load on each device, as needed or desired. Furthermore, the technique of assigning the weights can be changed at any time. This allows the allocation policy to be set dynamically and adjusted to meet the current requirements of the system. Further, the changing of the allocation policy can occur without restarting the file system.

The weights assigned to the devices can be dynamically changed to represent different values and/or to represent a different operating parameter (e.g., capacity, free space, I/O throughput, round-robin, hybrid). Further, the weighting assignment technique need not be known to the allocation technique. Further, the allocation technique can accommodate various data streams, including video streams and general data streams. This is because the allocation technique does not know and need not know apriori the length of the data streams and/or the access patterns of those data streams.

The allocation capability of the present invention is also able to stripe according to weight across a plurality of heterogeneous storage devices. That is, the storage devices may be of different sizes, different capacities and/or of different speeds. These heterogeneous devices can be utilized and that utilization can be maximized. For instance, storage usage can be maximized and/or throughput can be maximized.

Additionally, the allocation capability of the present invention can automatically compensate for an imbalance in the parallel file environment. Such an imbalance can be caused by adding devices to the system, removing devices from the system, or for any other reasons. The rebalancing of the environment is performed without necessarily restriping space already striped. In one example, the rebalancing is accomplished by obtaining new, different and/or additional weights and using an allocation technique to allocate space based on those weights.

The above-described computing environment is offered as only one example. One or more aspects of the present invention can be incorporated and used with many types of computing units, computers, processors, nodes, systems, work stations and/or environments without departing from the spirit of the present invention.

Various of the embodiments described above reference a node receiving information, providing information or performing some task. If, however, the node includes a plurality of file systems, then one or more of those file systems on the node may perform those actions.

The present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A method of managing the allocation of space on storage devices of a computing environment, said method comprising:
   obtaining one or more weights for one or more storage devices of said computing environment; and
   allocating space on at least one storage device of said one or more storage devices in proportion to at least one weight obtained for the at least one storage device, wherein said allocating is performed by a plurality of file systems of said computing environment.

2. The method of claim 1, wherein each of said plurality of file systems is located on a separate node of said computing environment.

3. The method of claim 1, wherein said plurality of file systems are located on one or more nodes of said computing environment.

4. The method of claim 1, wherein said allocating comprises executing an allocation technique by each file system of said plurality of file systems, wherein at least one file system of said plurality of file systems is running a different allocation technique than at least one other file system of said plurality of file systems.

5. The method of claim 1, wherein each storage device of said at least one storage device is partitioned into a plurality of partitions, and wherein one or more partitions of each storage device are owned by one or more file systems of said plurality of file systems.

6. The method of claim 1, wherein said allocating comprises allocating space on a plurality of storage devices by a plurality of file systems, wherein each file system of said plurality of file systems allocates space on one or more storage devices of said plurality of storage devices.

7. The method of claim 1, wherein said obtaining comprises using at least an allocation manager to obtain said one or more weights.

8. The method of claim 7, wherein said using comprises using said allocation manager and at least one node of said computing environment to obtain said one or more weights.

9. The method of claim 1, wherein said one or more weights represent at least one parameter of said computing environment.

10. The method of claim 1, wherein said allocating is independent of the obtaining of said one or more weights, wherein the allocating need not have knowledge of at least one of what the weights represent and how the weights were obtained.

11. The method of claim 1, wherein at least one storage device of said one or more storage devices has one or more different characteristics than at least one other storage device of said one or more storage devices.

12. The method of claim 1, further comprising propagating the at least one weight to at least one file system of said plurality of file systems.

13. The method of claim 1, further comprising:
   tracking changes associated with at least one weight of said one or more weights;
   adjusting said at least one weight based on the tracked changes; and
   propagating the at least one adjusted weight to a file system of said computing environment, wherein said at least one adjusted weight is usable in allocating space on at least one storage device.

14. The method of claim 13, wherein said tracking is performed by the file system.

15. The method of claim 13, wherein said tracking is performed by a plurality of file systems, and wherein said propagating comprises propagating the at least one adjusted weight to the plurality of file systems that performed the tracking.

16. The method of claim 13, further comprising informing an allocation manager, at a predefined event, of the tracked changes, and wherein said allocation manager performs the adjusting and the propagating.

17. The method of claim 1, further comprising informing said plurality of file systems of changes in said at least one weight, wherein said changes are usable in further allocating space.

18. The method of claim 1, further comprising adjusting at least one weight of said one or more weights, in response to a failure of a file system of said computing environment.

19. The method of claim 18, wherein said adjusting comprises at least one of:
   using information provided by at least one other file system of said computing environment to adjust said at least one weight; and
   using information obtained from reading at least one storage device associated with said at least one weight to adjust said at least one weight.

20. The method of claim 1, further comprising maintaining at least one weight of said one or more weights, in response to a failure of a file system of said computing environment.

21. The method of claim 1, wherein one file system of said plurality of file systems allocates space on said at least one storage device for a given file, and wherein said allocating for that given file is based on an allocation policy that uses said at least one weight.

22. The method of claim 21, wherein said one file system allocates space on one or more storage devices for another file, and wherein the allocating for that another file is based on another allocation policy that uses one or more weights associated with the one or more storage devices.

23. A method of managing the allocation of space on storage devices of a computing environment, said method comprising:

obtaining a weight for each storage device of at least a subset of storage devices of a plurality of storage devices of said computing environment; and allocating space on each storage device of said at least a subset of storage devices in proportion to the weight assigned to the storage device, wherein said allocating is performed by a plurality of file systems, such that each file system of said plurality of file systems allocates space on one or more storage devices of said at least said subset of storage devices.

24. A system of managing the allocation of space on storage devices of a computing environment, said system comprising:

means for obtaining one or more weights for one or more storage devices of said computing environment; and means for allocating space, by a plurality of file systems of said computing environment, on at least one storage device of said one or more storage devices in proportion to at least one weight obtained for the at least one storage device.

25. The system of claim 24, wherein each of said plurality of file systems is located on a separate node of said computing environment.

26. The system of claim 24, wherein said plurality of file systems are located on one or more nodes of said computing environment.

27. The system of claim 24, wherein said means for allocating comprises means for executing an allocation technique by each file system of said plurality of file systems, wherein at least one file system of said plurality of file systems is running a different allocation technique than at least one other file system of said plurality of file systems.

28. The system of claim 24, wherein each storage device of said at least one storage device is partitioned into a plurality of partitions, and wherein one or more partitions of each storage device are owned by one or more file systems of said plurality of file systems.

29. The system of claim 24, wherein said means for allocating comprises means for allocating space on a plurality of storage devices by a plurality of file systems, wherein each file system of said plurality of file systems allocates space on one or more storage devices of said plurality of storage devices.

30. The system of claim 24, wherein said means for obtaining comprises means for using at least an allocation manager to obtain said one or more weights.

31. The system of claim 30, wherein said means for using comprises means for using said allocation manager and at least one node of said computing environment to obtain said one or more weights.

32. The system of claim 24, wherein said one or more weights represent at least one parameter of said computing environment.

33. The system of claim 24, wherein said means for allocating is independent of the means of obtaining of said one or more weights, wherein the means for allocating need not have knowledge of at least one of what the weights represent and how the weights were obtained.

34. The system of claim 24, wherein at least one storage device of said one or more storage devices has one or more different characteristics than at least one other storage device of said one or more storage devices.

35. The system of claim 24, further comprising means for propagating the at least one weight to at least one file system of said plurality of file systems.

36. The system of claim 24, further comprising:

means for tracking changes associated with at least one weight of said one or more weights;

means for adjusting said at least one weight based on the tracked changes; and means for propagating the at least one adjusted weight to a file system of said computing environment, wherein said at least one adjusted weight is usable in allocating space on at least one storage device.

37. The system of claim 36, wherein said means for tracking comprises means for tracking by the file system.

38. The system of claim 36, wherein said means for tracking comprises means for tracking by a plurality of file systems, and wherein said means for propagating comprises means for propagating the at least one adjusted weight to the plurality of file systems used in the tracking.

39. The system of claim 36, further comprising means for informing an allocation manager, at a predefined event, of the tracked changes, and wherein said allocation manager performs the adjusting and the propagating.

40. The system of claim 24, further comprising means for informing said plurality of file systems of changes in said at least one weight, wherein said changes are usable in further allocating space.

41. The system of claim 24, further comprising means for adjusting at least one weight of said one or more weights, in response to a failure of a file system of said computing environment.

42. The system of claim 41, wherein said means for adjusting comprises at least one of:

means for using information provided by at least one other file system of said computing environment to adjust said at least one weight; and means for using information obtained from reading at least one storage device associated with said at least one weight to adjust said at least one weight.

43. The system of claim 24, further comprising means for maintaining at least one weight of said one or more weights, in response to a failure of a file system of said computing environment.

44. The system of claim 24, wherein one file system of said plurality of file systems allocates space on said at least one storage device for a given file, and wherein the allocating for that given file is based on an allocation policy that uses said at least one weight.

45. The system of claim 44, wherein said one file system allocates space on one or more storage devices for another file, and wherein the allocating for that another file is based on another allocation policy that uses one or more weights associated with the one or more storage devices.

46. A system of managing the allocation of space on storage devices of a computing environment, said system comprising:

means for obtaining a weight for each storage device of at least a subset of storage devices of a plurality of storage devices of said computing environment; and a plurality of file systems adapted to allocate space on each storage device of said at least a subset of storage devices in proportion to the weight assigned to the storage device, wherein each file system of said plurality of file systems allocates space on one or more storage devices of said at least said subset of storage devices.

47. A system of managing the allocation of space on storage devices of a computing environment, said system comprising:

at least one node adapted to obtain one or more weights for one or more storage devices of said computing environment; and a plurality of nodes adapted to allocate space on at least one storage device of said one or more storage devices in proportion to at least one weight obtained for the at least one storage device.

48. The system of claim 47, wherein said plurality of nodes comprise said at least one node.

49. At least one program storage device readable by a machine, tangibly embodying at least one program of instructions executable by the machine to perform a method of managing the allocation of space on storage devices of a computing environment, said method comprising:

obtaining one or more weights for one or more storage devices of said computing environment; and allocating space on at least one storage device of said one or more storage devices in proportion to at least one weight obtained for the at least one storage device, wherein said allocating is performed by a plurality of file systems of said computing environment.

50. The at least one program storage device of claim 49, wherein each of said plurality of file systems is located on a separate node of said computing environment.

51. The at least one program storage device of claim 49, wherein said plurality of file systems are located on one or more nodes of said computing environment.

52. The at least one program storage device of claim 49, wherein said allocating comprises executing an allocation technique by each file system of said plurality of file systems, wherein at least one file system of said plurality of file systems is running a different allocation technique than at least one other file system of said plurality of file systems.

53. The at least one program storage device of claim 49, wherein each storage device of said at least one storage device is partitioned into a plurality of partitions, and wherein one or more partitions of each storage device are owned by one or more file systems of said plurality of file systems.

54. The at least one program storage device of claim 49, wherein said allocating comprises allocating space on a plurality of storage devices by a plurality of file systems, wherein each file system of said plurality of file systems allocates space on one or more storage devices of said plurality of storage devices.

55. The at least one program storage device of claim 49, wherein said obtaining comprises using at least an allocation manager to obtain said one or more weights.

56. The at least one program storage device of claim 55, wherein said using comprises using said allocation manager and at least one node of said computing environment to obtain said one or more weights.

57. The at least one program storage device of claim 49, wherein said one or more weights represent at least one parameter of said computing environment.

58. The at least one program storage device of claim 49, wherein said allocating is independent of the obtaining of said one or more weights, wherein the allocating need not have knowledge of at least one of what the weights represent and how the weights were obtained.

59. The at least one program storage device of claim 49, wherein at least one storage device of said one or more storage devices has one or more different characteristics than at least one other storage device of said one or more storage devices.

60. The at least one program storage device of claim 49, wherein said method further comprises propagating the at least one weight to at least one file system of said plurality of file systems.

61. The at least one program storage device of claim 49, wherein said method further comprises:

tracking changes associated with at least one weight of said one or more weights;

adjusting said at least one weight based on the tracked changes; and propagating the at least one adjusted weight to a file system of said computing environment, wherein said at least one adjusted weight is usable in allocating space on at least one storage device.

62. The at least one program storage device of claim 61, wherein said tracking is performed by the file system.

63. The at least one program storage device of claim 61, wherein said tracking is performed by a plurality of file systems, and wherein said propagating comprises propagating the at least one adjusted weight to the plurality of file systems that performed the tracking.

64. The at least one program storage device of claim 61, wherein said method further comprises informing an allocation manager, at a predefined event, of the tracked changes, and wherein said allocation manager performs the adjusting and the propagating.

65. The at least one program storage device of claim 49, wherein said method further comprises informing said plurality of file systems of changes in said at least one weight, wherein said changes are usable in further allocating space.

66. The at least one program storage device of claim 49, wherein said method further comprises adjusting at least one weight of said one or more weights, in response to a failure of a file system of said computing environment.

67. The at least one program storage device of claim 66, wherein said adjusting comprises at least one of:

using information provided by at least one other file system of said computing environment to adjust said at least one weight; and using information obtained from reading at least one storage device associated with said at least one weight to adjust said at least one weight.

68. The at least one program storage device of claim 49, wherein said method further comprises maintaining at least one weight of said one or more weights, in response to a failure of a file system of said computing environment.

69. The at least one program storage device of claim 49, wherein one file system of said plurality of file systems allocates space on said at least one storage device for a given file, and wherein the allocating for that given file is based on an allocation policy that uses said at least one weight.

70. The at least one program storage device of claim 69, wherein said one file system allocates space on one or more storage devices for another file, and wherein the allocating for that another file is based on another allocation policy that uses one or more weights associated with the one or more storage devices.

71. At least one program storage device readable by a machine, tangibly embodying at least one program of instructions executable by the machine to perform a method of managing the allocation of space on storage devices of a computing environment, said method comprising:

obtaining a weight for each storage device of at least a subset of storage devices of a plurality of storage devices of said computing environment; and allocating space on each storage device of said at least a subset of storage devices in proportion to the weight assigned to the storage device, wherein said allocating is performed by a plurality of file systems, such that each file system of said plurality of file systems allocates space on one or more storage devices of said at least said subset of storage devices.

* * * * *